Figure 1:
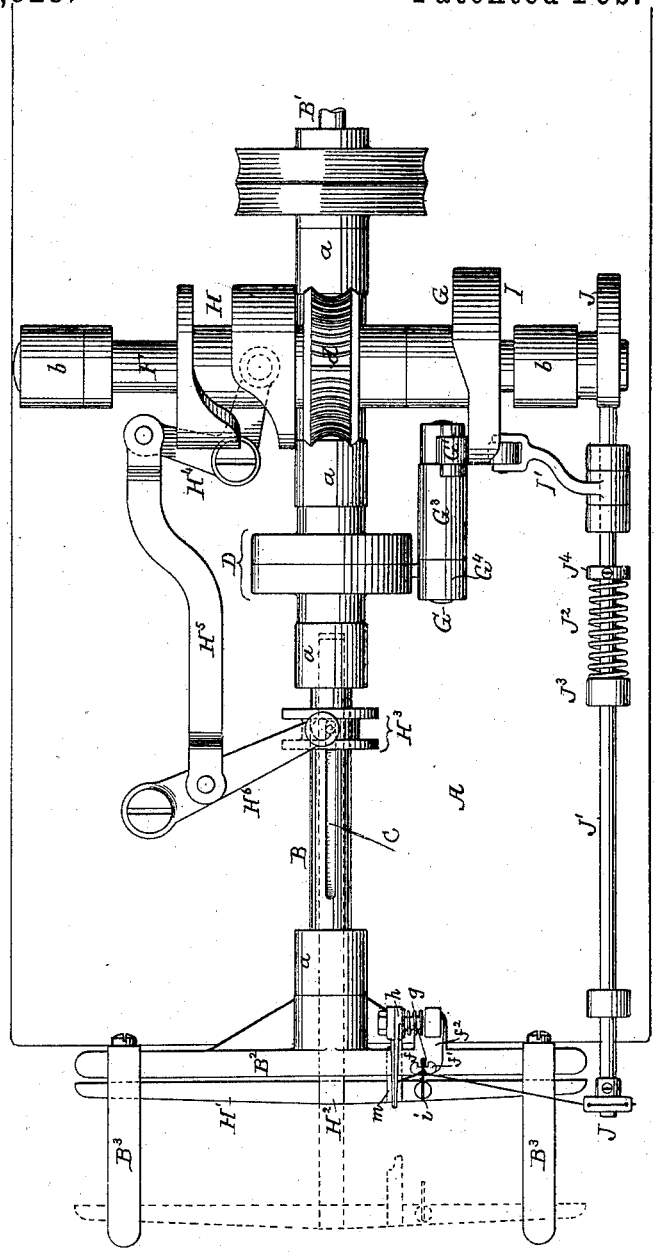

(No Model.) 2 Sheets—Sheet 1.

G., J. G. & M. O. REHFUSS.
MACHINE FOR FORMING SKEINS OR HANKS.

No. 468,628. Patented Feb. 9, 1892.

Witnesses:
Fred D. Goodwin.
Hamilton D. Turner

Inventors:
George Rehfuss,
John G. Rehfuss &
Martin O. Rehfuss
by their Attorneys
Howson & Howson

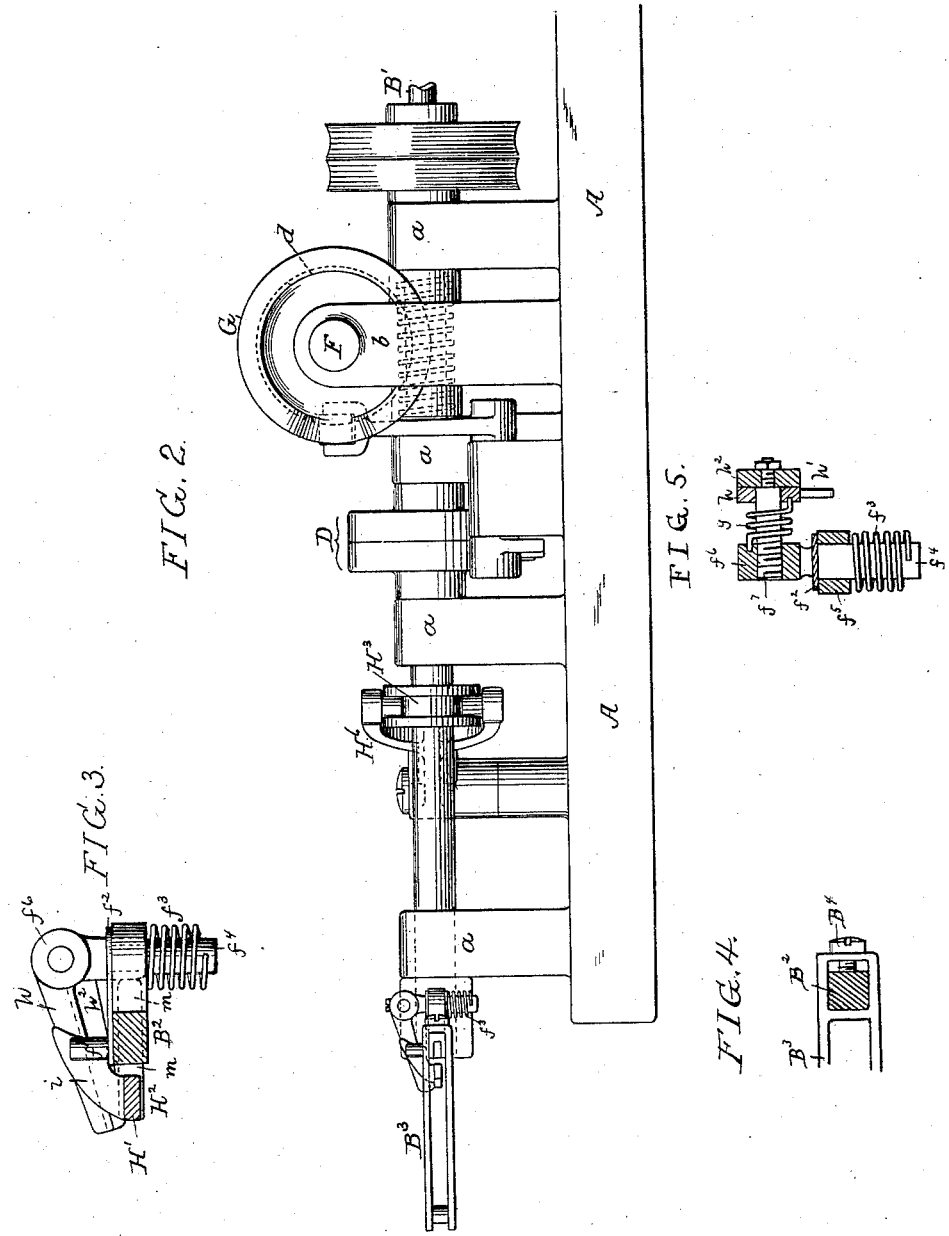

UNITED STATES PATENT OFFICE.

GEORGE REHFUSS, JOHN GEORGE REHFUSS, AND MARTIN O. REHFUSS, OF PHILADELPHIA, PENNSYLVANIA.

MACHINE FOR FORMING SKEINS OR HANKS.

SPECIFICATION forming part of Letters Patent No. 468,628, dated February 9, 1892.

Application filed April 21, 1891. Serial No. 389,839. (No model.)

*To all whom it may concern:*

Be it known that we, GEORGE REHFUSS, JOHN GEORGE REHFUSS, and MARTIN O. REHFUSS, citizens of the United States, and residents of Philadelphia, Pennsylvania, have invented certain Improvements in Machines for Forming Skeins or Hanks, of which the following is a specification.

The object of our invention is to construct a machine for rapidly winding successive skeins or hanks of yarn, severing the yarn between the successive skeins, and delivering the latter, so that they can be afterward used in the manufacture of tassels for upholstery and other trimmings.

In the accompanying drawings, Figure 1 is a plan view of a machine constructed in accordance with our invention. Fig. 2 is a side view of the same; and Figs. 3, 4, and 5 are detached sectional views on a larger scale illustrating certain details of construction.

A represents the bed-plate of the machine, which has suitable standards $a$, forming the bearings for a winding-shaft B and for a driving-shaft B', these shafts being connected by a clutch D, which, as shown in the drawings, is similar to that forming the subject of Letters Patent No. 362,997, dated May 17, 1887, but which may be of any desired form.

To bearings $b$ on the bed A is adapted a cam-shaft F, which has a worm-wheel $d$ engaging with a worm $d'$ on the driving-shaft B', (see dotted lines, Fig. 2,) said shaft F having a series of cams G, H, I, and J, as shown in Fig. 1. The cam G acts upon an anti-friction roller G' on one arm of a rock-shaft $G^2$, which is free to turn in a bearing $G^3$ on the bed A and has another arm $G^4$ for operating the clutch D.

The winding-shaft B has at the outer end a winding-head $B^2$, which has projecting winding arms or fingers $B^3$ secured thereto, these arms or fingers being adjustable on the winding-head to a position more or less remote from the axis of the same, depending upon the size of the hank or skein which is to be formed. The arms or fingers $B^3$ may be constructed so as to embrace the head $B^2$, as shown in Fig. 4, and may be secured in position after adjustment on the head by tightening set-screws $B^4$, so as to clamp the arms or fingers to said head.

Each of the winding arms or fingers consists of upper and lower bars connected at the ends, and in the space between these bars is free to play the end portions of a pusher-bar H', which is carried by the front end of a shaft $H^2$, the latter being contained within the winding-shaft, which is tubular throughout the greater portion of its length, as shown by dotted lines in Fig. 1. The inner portion of the central shaft $H^2$ is connected to a sleeve $H^3$, surrounding the winding-shaft, the connecting-pin passing through a longitudinal slot $c$ in said winding-shaft, as shown in Fig. 1, and the sleeve $H^3$ and its shaft $H^2$ are reciprocated at intervals by means of the cam H, the latter acting through the medium of a bell-crank lever $H^4$, link $H^5$, and pivoted arm $H^6$.

Mounted on the winding-head $B^2$ is a spring yarn-retainer and a pair of shears, said yarn-retainer consisting of a fixed jaw $f$ and a movable jaw $f'$, the latter being carried by an arm $f^2$, which, as shown in Fig. 5, has a spindle $f^4$, adapted to a bearing in a boss $f^5$ at the back of the head $B^3$, a spring $f^3$ acting on this spindle and tending to turn the same, so as to press the jaw $f'$ against the jaw $f$. Projecting upward from the arm $f^2$ is a head $f^6$, from which projects a spindle $f^7$, and to the outer end of this spindle is secured the fixed blade $h^2$ of the pair of shears, the movable blade $h$ of the shears being mounted so as to turn on the spindle $f^7$, and being acted on by a spring $g$, which tends to open the shears, the blade $h$, however, having a downwardly-projecting lug or arm $h'$, which is acted upon by the device described hereinafter so as to close the shears.

On the pusher-bar H' is a blade $i$, which, when said pusher-bar is at the limit of its inward movement, as shown in Fig. 1, passes between the jaws $f f'$ of the retainer.

The cam I acts upon an anti-friction roller on an arm I', which is splined upon a rod J', the inner end of which is acted upon by the cam J, the latter tending to impart an outward movement or thrust to said rod, inward movement of the same being effected by a spring $J^2$, interposed between a bearing $J^3$ on the bed-plate and a collar $J^4$ on the rod. At the outer end of the rod J' is a thread-guide $J^5$, which consists of an arm having any appropriate form of tension device for the arm.

Projecting inward from the pusher-bar H' is a finger $m$, which when the pusher-bar is at the limit of its inward movement acts upon a lug $h'$ on the movable blade $h$ of the shears, as shown in Fig. 3, so as to effect the closing of said shears against the action of the spring $g$.

In the operation of the device the yarn is first held between the nipping-jaws $ff'$ and passes thence to the guides on the arm $J^5$ of the guide-rod. Rotary motion being imparted to the winding-head, the yarn is wound in the form of a hank or skein upon the arms or fingers $B^3$ at a point beyond the pusher-bar H', the guide-rod J' having a slow longitudinal movement during the winding operation, so as to properly lay the yarn upon the fingers. As soon as the desired number of turns have been made, the clutch D is thrown out of gear by the cam G, and the movement of the winding-shaft B is thereby arrested. The pusher-shaft $H^2$ and its bar H' are then projected by the action of the cam H, so as to push the skein or hank outward on the arms $B^3$, as shown by dotted lines in Fig. 1. At the same time the guide-rod J' is retracted, and a slight rocking movement is imparted thereto by the cam I and arm I', so that the yarn is carried in front of the blade $i$ of the pusher-bar. Hence when the latter is by the action of the cam H and intermediate devices retracted to the position shown by full lines in Fig. 1, the blade will again thrust the yarn into the nipper-jaws $ff'$, the finger $m$ of the pusher-bar finally acting upon the movable blade $h$ of the shears so as to sever the yarn at a point between the nippers and the hank or skein which has been wound. Other forms of cutter may be used in place of the shears, if desired.

The hank or skein may be removed from the arms $B^3$ by the attendant, or said skein may be pushed from the arms by a subsequently-formed skein when the latter is moved outward by the pusher-bar.

We do not in this application claim, broadly, the combination of a winding-shaft, winding mechanism thereon, a driving-shaft, a clutch connecting the two, a shaft having cams for operating different elements of the winding mechanism, and gearing connecting said cam-shaft and the driving-shaft, as this combination forms the subject of claim in a separate application filed by us of even date herewith, Serial No. 389,840.

Having thus described our invention, we claim and desire to secure by Letters Patent—

1. In a skein-winding machine, the rotating winding-head having arms or fingers, a shaft carrying the same, a pusher-bar, and a pusher-shaft contained within the winding-shaft and combined with means for reciprocating it, substantially as specified.

2. In a skein-winding machine, the rotating winding-head, the shaft carrying the same, a reciprocating pusher-bar, a pusher-bar shaft within the winding-shaft, and winding arms or fingers hollow or slotted for the reception of the ends of the pusher-bar, substantially as specified.

3. In a skein-winding machine, the rotating winding-head having a yarn-retainer and a reciprocating pusher-bar provided with a blade for entering said retainer, substantially as specified.

4. In a skein-winding machine, the rotating winding-head having a yarn-cutter, and a reciprocating pusher-bar having a finger for operating said cutter, substantially as specified.

5. In a skein-winding machine, the rotating winding-head having a yarn-retainer, a cutter for the yarn, and a reciprocating pusher-bar having a blade for entering the retainer, and a finger for operating the cutter, substantially as specified.

6. In a skein-winding machine, the rotating winding-head having a yarn-retainer, and a reciprocating pusher-bar having a blade for entering said retainer, in combination with a yarn-guide, and means for rocking or vibrating the latter so as to cause it to lay the yarn in front of said blade, substantially as specified.

7. In a skein-winding machine, the rotating winding-head having a yarn-retainer, and a reciprocating pusher-bar with blade for entering said retainer, in combination with a yarn-guide, and means for imparting both a longitudinal reciprocating and a rocking and vibrating movement to said guide, substantially as specified.

8. The combination of the rotating winding-head, the winding-shaft, the driving-shaft, a clutch connecting the two, a cam-shaft geared to said driving-shaft, a pusher-bar, a shaft carrying the same and contained within the winding-shaft, and cams on the cam-shaft for reciprocating said pusher-shaft and for operating the clutch, substantially as specified.

9. A skein-winding-machine having a rotating winding-head, a reciprocating pusher guided so as to engage with the wound skein and push the same from the winding-head, a cutting device so located as to receive and cut the yarn after the completion of the skein, and a retainer for receiving the cut end of the yarn and holding the same preparatory to the winding of a fresh skein, substantially as specified.

In testimony whereof we have signed our names to this specification in the presence of two subscribing witnesses.

GEORGE REHFUSS.
JOHN GEORGE REHFUSS
MARTIN O. REHFUSS.

Witnesses:
EUGENE ELTERICH,
HARRY SMITH.